July 8, 1947. L. H. PECHER 2,423,615
FISHING LURE
Filed Oct. 12, 1944 2 Sheets-Sheet 1
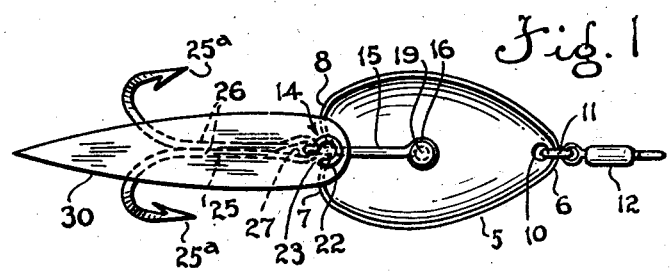
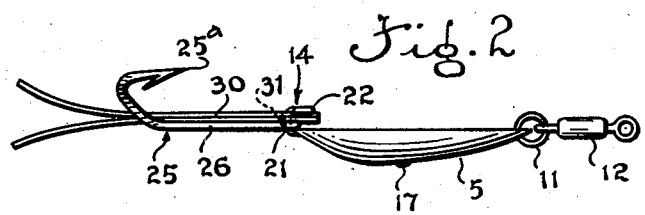
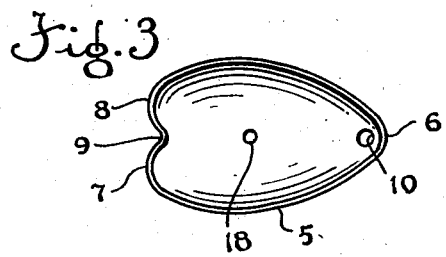
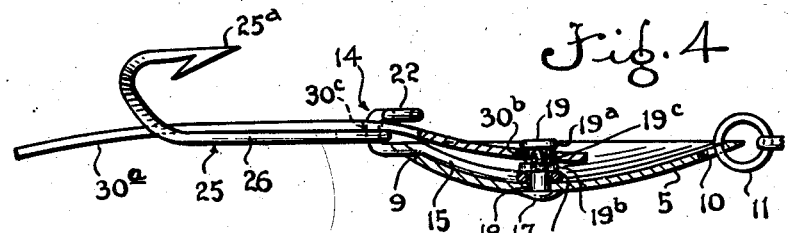
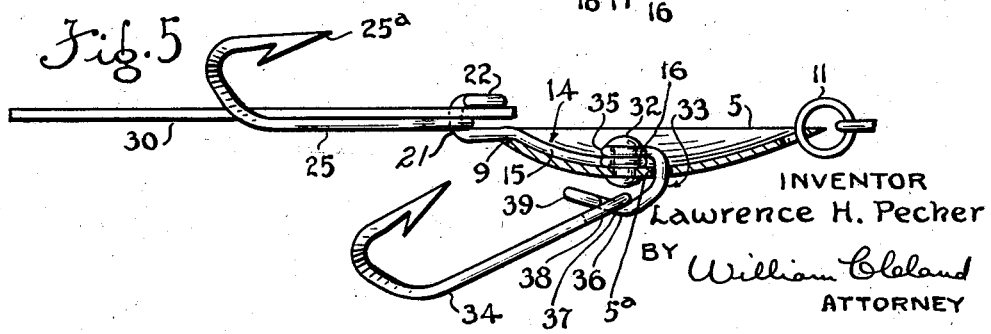
INVENTOR
Lawrence H. Pecher
BY William Cleland
ATTORNEY July 8, 1947.  L. H. PECHER  2,423,615
FISHING LURE
Filed Oct. 12, 1944  2 Sheets-Sheet 2

INVENTOR
*Lawrence H. Pecher*
BY
*William Cleland*
ATTORNEY

Patented July 8, 1947

2,423,615

UNITED STATES PATENT OFFICE 2,423,615

FISHING LURE

Lawrence H. Pecher, Akron, Ohio

Application October 12, 1944, Serial No. 558,383

8 Claims. (Cl. 43—42)

This invention relates to improvements in fishing lures or baits and, while intended for use generally wherever applicable to lures of various types, particularly relates to lures of the spoon type.

An object of the invention is to provide an artificial fishing lure of simple economical construction, including a body of the spoon type, for example, and a novel attaching member for quickly and detachably securing either a fish hook alone, or a hook together with auxiliary bait such as a strip of pork rind, or rubber.

Another object of the invention is to provide in a lure of the character described improved hook-attaching means by means of which auxiliary bait may be quickly secured in any of a plurality of positions, depending upon the shape of such auxiliary bait used and the bait action desired.

The above objects are accomplished and additional advantages attained by the new arrangement and novel construction of parts shown in the accompanying drawing and hereinafter described.

In the drawings:

Figure 1 is a top plan view of a lure constructed in accordance with this invention.

Figure 2 is a side elevational view of same.

Figure 3 is a top plan view of the spoon forming the body of the illustrated adaptation of the invention.

Figure 4 is a longitudinal cross-section, on an enlarged scale, taken substantially through the center of the lure as illustrated in Figure 1, but with an auxiliary bait shown attached thereto in an alternative manner.

Figure 5 is a fragmentary vertical cross-section of the lure on an enlarged scale, taken at the center of the spoon as shown in Figure 1, but illusarating a modified form of hook attachment.

Figure 6:
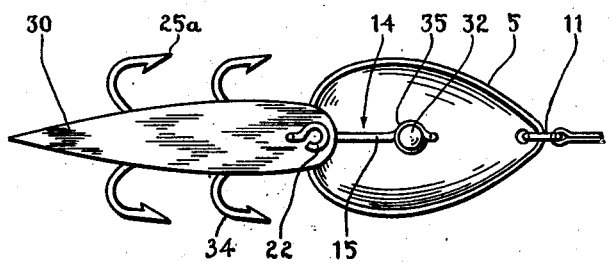
Figures 6 and 7 are top and bottom plan views, respectively, of the lure shown in Figure 5.
Figure 7:
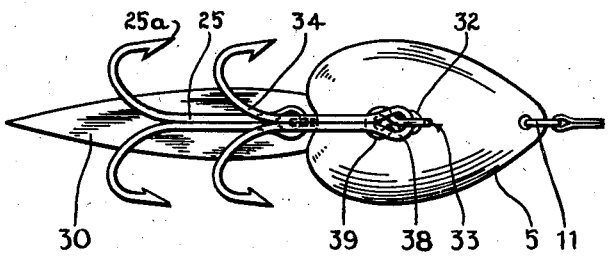

Proceeding now to a detailed description of the adaption of the invention shown in the drawing, the numeral 5 denotes a concavo-convex body or spoon formed of a cordate blank. The forward end of the body 5 terminates in a rounded point 6 and the rear end of the body is provided with the lobes 7 and 8 thus forming a notch 9 therebetween. The numeral 10 denotes an aperture through the body closely adjacent the forward end thereof to loosely receive a ring 11, a suitable swivel 12 being connected to the ring 11 for rotatably securing a line to the lure. The concave side of the body 5 is normally presented upwardly in use of the lure.

The numeral 14 designates an attachment formed of relatively stiff wire to provide an elongated shank portion 15 terminating at the forward end thereof in an eyelet 16. Member 14 is secured to the upper or concave side of body 5, by means of a screw 17, received through an aperture 18 therein and eyelet 16 of attachment 15, and a nut 19 threaded on the upper end of the screw, aperture 18 being located on the medial line of the body intermediate the ends thereof. The nut 19 may be provided with spaced annular flanges or ribs 19a and 19b for a purpose to be described later. A suitable rivet or other fastening means may be substituted for screw 18 and nut 19.

The shank 15 is curved rearwardly along the medial line of the body, and engages through the notch 9 to insure against pivotal movement of the attachment. The rear end of shank 15 is formed vertically upwardly at 21 and extended forwardly to form a horizontal eyelet or loop 22. As shown in Figure 1, the loop 22 is provided with a gap 23 at the end of the wire.

The numeral 25 designates a double hook of suitable construction. This twin hook 25 may have parallel shanks 26, looped at the forward end to form an eye 27 of sufficient length to receive loop 22 therethrough in widthwise manner. The forwardly terminating barbed ends 25a of shanks 26 may extend in upwardly and outwardly inclined planes. The hook 25 is quickly detachably mounted on the attachment 14 by entering loop 22 of the latter through the eye 27 of the hook and turning the same to receive vertical portion 21 through the eye 27. The hook is then free to pivot in a substantially horizontal plane about portion 21. In some instances it may be found more convenient to mount the hook by engaging the eyelet thereof through the gap 23 of attachment eyelet 22.

The numeral 30 denotes a pork rind which may be formed with a broad forward end provided with a suitable aperture 31. While natural pork rind may be used, it will be understood that one or more strips of rubber, synthetic rubber, or other suitable material may be used if desired and that the term "pork rind" as used in the claims shall include such materials. One or more strips 30 of the same or contrasting color may be used if desired.

The rind 30 may be secured on the lure by engaging the same in gap 23 of eyelet 22 to receive the free end of the latter through aperture 31 in the rind, which is then readily swung around and down onto portion 21, in the manner of hook 25, and as illustrated in Figures 1 and 2. In this manner of mounting the rind it is free to swing on post 21 with the hook. As illustrated in Figure 4, the rind 30a may be provided with spaced apertures 30b and 30c, adapted to receive reduced portion 19c of nut 19 and vertical post 21, respectively, in which condition the rind is held against substantial pivotal movement.

Referring to Figure 5 there is shown a modified form of the lure, which is substantially like the lure in Figure 4 except that attachment 14 is riveted at 32 to spoon 5, and an attachment 33 of suitable wire may be secured to spoon 5 by the same rivet for attaching a second double hook 34 similar to hook 25. For convenience, like parts are given like numerals.

Attachment 33 is secured to spoon 5 by an eyelet 35 formed thereon and received on rivet 32 above eyelet 16 of attachment 14. The wire of attachment 33 is bent downwardly through an aperture 5a in the spoon, and then downwardly and rearwardly and extended upwardly and rearwardly, in a vertical plane in the form of a V-notch as indicated at 36. The rearward extension 37 of the V-notch is adapted to receive the eyelet 38 of a double hook, similar to hook 25, which is retained thereon by said extension terminating in an eyelet 39 formed in a laterally extending plane of the extension. The eyelet 39 limits upward movement of the hook 34, beyond a desired angle during use of the lure. Reception of attachment 33 through aperture 5a in the spoon prevents the attachment from turning on rivet 32. On the use of lures as described above, as for trolling or casting, the spoon 5 will wobble and dart from side-to-side below the surface of the water, while the rinds 30, particularly when a single thickness is used, will flutter longitudinally with a wave or ripple-like movement. This action has been found to be very attractive to fish life. The construction of the attachments 14 and 33 materially minimizes kinking or locking of the respective hooks 25 and 34 in forward positions.

It will be seen that the lure herein illustrated and described may be used without the strips 30 with any suitable form of hook or hooks which can be attached to the member 14 and that a buck tail or other auxiliary lure may be substituted for the strips 30 without departing from the invention.

A line is attached to the swivel 12, and the lure may then be utilized in casting, trolling or in any desired manner.

Modifications of the invention may be resorted to without departing from the spirit thereof or the scope of the appended claims.

What is claimed is:

1. In a fishing lure of the character described, a concavo-convex body; an attaching member secured to the concave face of said body at a point intermediate the length thereof, said attaching member extending rearwardly along the face of said body to adjacent the rear edge thereof and extending upwardly and forwardly to form a vertical portion and terminating in a forwardly projecting horizontal loop having a gap therein; and a fishing hook and auxiliary lure mounted on said member in a swinging position on the vertical portion thereof and means to attach a line to the forward portion of said body.

2. In a fishing lure a concavo-convex spoon; means for securing a line to said forward end; the rear edge of said spoon having a centrally positioned notched portion, an attachment secured to the concave face of said spoon and extending rearwardly along said face and through said notch, said attachment being extended upwardly to form a vertical loop which terminates in a forwardly projecting horizontal loop, a hook mounted on said vertical loop in a trailing position relative to said spoon.

3. In a fishing lure, a body, a fastening member secured thereto at a point intermediate the length thereof, said member extending rearwardly to adjacent the rear end thereof and terminating at said end in an upwardly and forwardly extending loop, the forwardly extending portion of said loop being formed in a horizontal loop and a hook mounted on said vertical loop.

4. In a member for attaching a hook and auxiliary lure to an artificial bait, a wire, means to secure the forward end of said wire to the body of the lure, said wire having a shank portion adapted to extend along the body to adjacent the rear thereof and terminating in a vertical loop having a forwardly extended portion formed in a horizontal loop having a gap therein.

5. In a fishing lure of the character described, a cordate, concavo-convex body; an attaching member secured to the concave face of said body at a point intermediate the length thereof, said attaching member extending rearwardly along the face of said body to adjacent the rear edge thereof and extending upwardly and forwardly to form a vertical portion and terminating in a forwardly projecting horizontal loop having a gap therein; and a fishing hook and auxiliary lure mounted on said member in a swinging position on the vertical portion thereof and means to attach a line to the forward portion of said body.

6. In a fishing lure, a concavo-convex body, a fastening member secured to the concave side of said body at a point intermediate the length thereof, said member extending rearwardly to adjacent the rear end thereof and terminating at said end in an upwardly and forwardly extending loop, the forwardly extending portion of said loop being formed in a horizontal loop and a hook mounted on said vertical loop and a second fastening member secured to the concave side of said body and extended outwardly through the body, said outward extension being formed downwardly and then extended upwardly and rearwardly to provide a notch for receiving the eye of a second fish hook, said upward and rearward extension terminating in an eyelet in a plane transversely of the plane of the notch and adapted to retain the hook in said notch and to limit upward swinging movement thereof.

7. Attaching means adapted for use with a fishing lure, comprising a wire having eyes at the ends thereof and an intermediate loop, and a second wire having eyes at the ends thereof and an intermediate loop, an eye of each wire being adapted for position in axial alignment with each other and when so positioned, locating the other eyes so that each latter eye constitutes a stop for the eye of a hook which may be mounted on the loop adjacent that eye.

8. An attaching member adapted for use with a fishing lure, comprising wire means having at least two eyes and an intermediate loop between two said eyes, one of the eyes constituting a stop for a hook eye positioned on the loop, and another of the eyes constituting a means for securing said wire means to the lure.

LAWRENCE H. PECHER.

REFERENCES CITED

The following references are of record in the file of this patent:

UNITED STATES PATENTS

| Number | Name | Date |
| --- | --- | --- |
| 1,201,113 | Trester | Oct. 10, 1916 |
| 1,265,900 | Foss | May 14, 1918 |
| 1,638,215 | Rodgers | Aug. 9, 1927 |